United States Patent [19]
Stacy et al.

[11] Patent Number: 5,481,151
[45] Date of Patent: Jan. 2, 1996

[54] ELECTROMAGNETIC SHIELD FOR ALTERNATING CURRENT INDUCTION RAILWAY MOTORS

[75] Inventors: Len E. Stacy, Erie; George J. Wnukoski, North East, both of Pa.

[73] Assignee: General Electric Company, Erie, Pa.

[21] Appl. No.: 409,920

[22] Filed: Mar. 24, 1995

Related U.S. Application Data

[63] Continuation of Ser. No. 265,907, Jun. 27, 1994, abandoned.

[51] Int. Cl.⁶ .................................................... H02K 1/12
[52] U.S. Cl. ............................................. 310/256; 310/89
[58] Field of Search ................................. 310/66, 68 R, 310/85, 88, 89, 255, 256

[56] References Cited

U.S. PATENT DOCUMENTS

| | | | |
|---|---|---|---|
| 1,677,004 | 7/1928 | Pohl | 310/256 |
| 2,323,662 | 7/1943 | Jenkins et al. | 310/255 |
| 3,714,483 | 1/1973 | Nurnberg et al. | 310/256 |
| 4,152,615 | 5/1979 | Calfo et al. | 310/256 |
| 4,281,266 | 7/1981 | Calfo et al. | 310/256 |
| 5,243,248 | 9/1993 | Benford et al. | 310/256 |
| 5,325,005 | 6/1994 | Denk | 310/256 X |

FOREIGN PATENT DOCUMENTS

| | | |
|---|---|---|
| 9316519 | 8/1993 | European Pat. Off. . |
| 2094057 | 3/1982 | United Kingdom . |

*Primary Examiner*—Mark O. Budd
*Attorney, Agent, or Firm*—Ann M. Agosti; Marvin Snyder

[57] ABSTRACT

An electromagnetic shield for an AC motor comprises a stack including a plurality of ferro-magnetic shield layers. Each one of the plurality of shield layers is at least partially electrically insulated from and substantially aligned with the others of the plurality of shield layers. The plurality of shield layers are positioned over a portion of the AC motor near an area where an axle will be positioned.

17 Claims, 2 Drawing Sheets

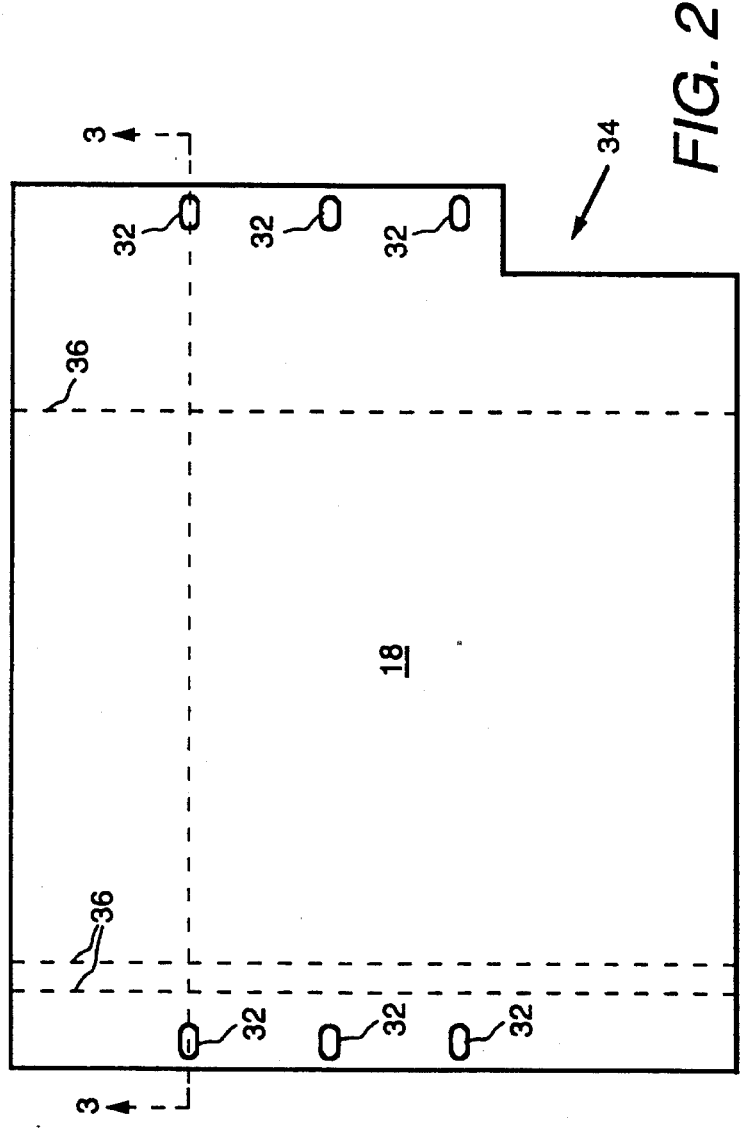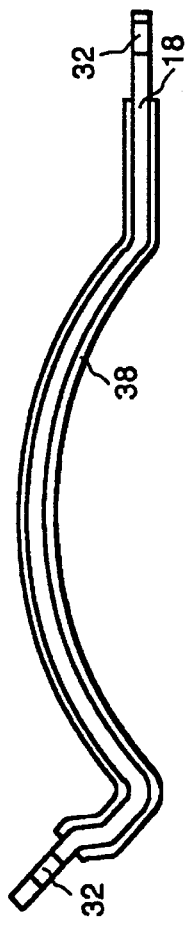

ELECTROMAGNETIC SHIELD FOR ALTERNATING CURRENT INDUCTION RAILWAY MOTORS

This application is a continuation of application Ser No. 08/265,907 filed Jun. 27, 1994 now abandoned.

BACKGROUND OF THE INVENTION

1. Field of the Invention

This invention relates generally to alternating current (AC) motors and, more particularly, to AC traction motors in railroad or transit propulsion applications having AC voltages induced in the axles.

2. Description of the Related Art

In AC railway propulsion motors, the close proximity of traction motors to railway axles results in AC voltages which are induced in the axles and which can adversely affect railway signal systems.

SUMMARY OF THE INVENTION

Accordingly, an object of the present invention is to reduce electromagnetic (EM) radiation and electromagnetic interference (EMI) which is radiated from alternating current (AC) traction motors in railroad or transit propulsion applications. Generally the needed protection is for frequencies in the 0 to 3 kHz range in contrast to more typical shielding requirements in the giga-Hz and mega-Hz frequency ranges.

Briefly, in accordance with a preferred embodiment of the invention, an electromagnetic shield for an AC motor comprises a stack including a plurality of ferro-magnetic shield layers. Each one of the plurality of shield layers is at least partially insulated from and substantially aligned with the others of the plurality of shield layers. Positioning means are provided for positioning the plurality of shield layers over a portion of the AC motor near an area where an axle will be positioned.

In accordance with another embodiment of the invention, an electromagnetic shield for an AC motor comprises a stack including a plurality of ferro-magnetic shield layers. Each of the shield layers is at least partially electrically insulated from the others of the plurality of shield layers and has at least two openings. Each of the openings of one of the plurality of shield layers is substantially aligned with corresponding openings in others of the plurality of shield layers to form a set of aligned openings. At least two fasteners are provided with each fastener extending through a respective set of aligned openings and into a corresponding opening in the AC motor for fastening the plurality of shield layers over a portion of the AC motor near an area where an axle will be positioned.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

FIG. 1 is a sectional side view of an AC motor and an axle having an electromagnetic shield of the present invention there between;

FIG. 2 is front view of one of the shield layers shown in FIG. 1; and

FIG. 3 is a side view of the shield layer of FIG. 2 further showing a coating of non-magnetic material.

DETAILED DESCRIPTION OF A PREFERRED EMBODIMENT OF THE INVENTION

Figure 1:
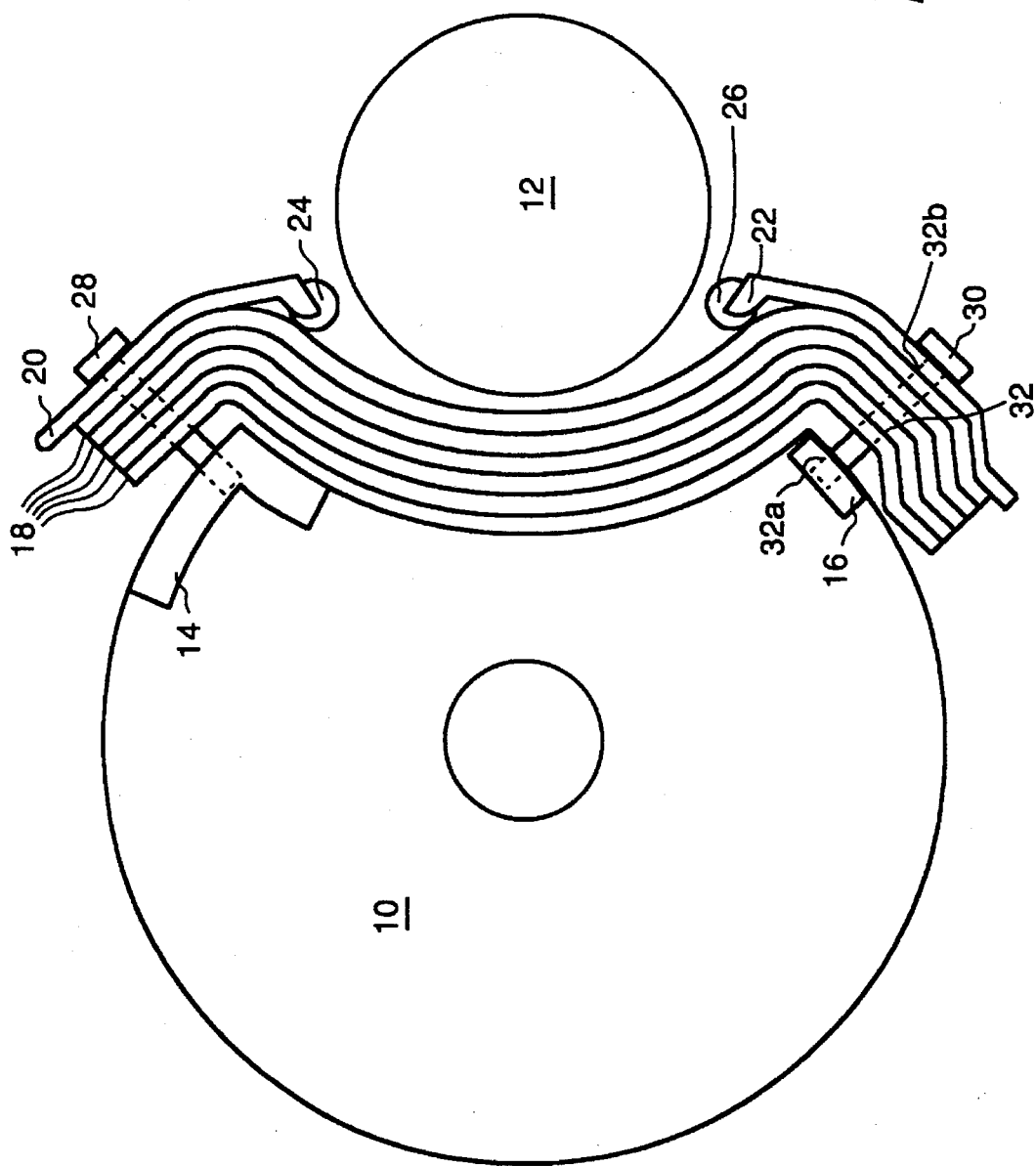

FIG. 1 is a sectional side view of an AC motor 10 and an axle 12 having an electromagnetic shield of the present invention there between. The electromagnetic shield includes a stack of a plurality of shield layers 18. In one embodiment, the stack includes five shield layers.

Each shield layer comprises a ferro-magnetic material such as low carbon electric motor laminate steel or transformer laminate steel, for example. In one embodiment, each shield layer has a thickness of about 0.014 inches. Each shield layer is at least partially electrically insulated by a non-magnetic material from the other shield layers.

In one embodiment, the insulation is provided by at least partially coating the shield layers with a thin coating of electrically insulative, non-magnetic material, shown as thin coating 38 in FIG. 3, so that the ferro-magnetic materials of adjacent shield layers are not in substantial contact. In this embodiment, the thickness of the thin coating ranges from 1 to 2 mils. The thin coating may comprise, for example, inorganic varnishes that are conventionally already coated on both sides of stator and rotor laminations. Although in the preferred embodiment the thin coating is on both sides of each shield layer, the thin coating may alternatively be coated only on a single side of each shield layer.

In another embodiment, an insulation layer of electrically insulative, non-magnetic material is inserted between each of the shield layers. The insulation layer may comprise a material such as an adhesive, for example.

Complete electrical isolation of shield layers is not necessary. The thin coatings or insulation layers are necessary, however, to increase the resistance between the shield layers and to create eddy currents, which lead to magnetic fields operating in the opposite direction of the fields induced in the axle, to reduce the resulting electromagnetic field.

The shield layers are bent to fit in the area between AC motor housing 10 and axle 12. In one embodiment, each shield layer is individually bent before the shield layers are positioned adjacent each other in the stack. Each shield layer has approximately the same shape as the others with adjustments made so that the shield layers can be positioned adjacent each other in the stack. The shape of the bend of the shield layers shown in FIGS. 1 and 3 is for example only. Any appropriate shape which allows positioning of the shield layers between motor 10 and axle 12 can be used.

Shield layers 18 can be held in position with any appropriate positioning means. In one embodiment, the shield layers are held in place on first and second shield support brackets 14 and 16 with first and second mechanical fasteners 28 and 30 and first and second clamping plates 20 and 22. In this embodiment, each shield layer has at least two shield layer openings 32, each support bracket is a part of motor housing 10 and has at least one motor opening 32a, and each clamping plate overlies a portion of the shield layers and has at least one plate opening 32b. The mechanical fasteners can be inserted through the plate and shield layer openings and into the motor openings to position the shield layers.

The mechanical fasteners may comprise bolts and the material of the mechanical fasteners may comprise a metallic material, such as stainless steel, for example, or a nonmetallic material, such as nylon.

In one embodiment, the support brackets may comprise mild steel, for example, and can be welded to the motor housing 10. The use of two shield support brackets is for purposes of example only. In alternative embodiments, a large single support bracket can be welded to the motor housing 10 or more than two supports brackets could be positioned on the motor housing 10.

The clamping plates can be non-magnetic if they are situated outside of the shield layers, as shown in FIG. 1. Although not required, the clamping plates have advantages over the use of a fastener alone or a fastener with a washer because the clamping plates help to protect the shield from damage due to impact from foreign objects. Preferably, first and second plastic edge guards 24 and 26 are present on edges of the respective first and second clamping plates to improve the seal between the clamping plates and the shield layers.

In another embodiment, the shield layers are held in position with a weld. The weld can be formed in any conventional manner, such as, for example, using welding material between the motor housing and shield layers under appropriate temperature and pressure conditions. In a related embodiment, an adhesive bond, such as a glue or an epoxy which can withstand high temperature applications, is used.

The stack of shield layers need not extend completely around the motor housing or axle, but need only subtend an arc of the motor housing in the area of the axle which is big enough so the motor's own ferro-magnetic structure is adequately shielded. Furthermore, the shield layers do not need to extend the entire length of the motor.

FIG. 2 is front view of one of the shield layers 18 with openings 32, and FIG. 3 is a side view of the shield layer of FIG. 2 with an exaggerated thickness along lines 33 further showing a coating of non-magnetic material 38. In a preferred embodiment, the coating comprises a material with a lower electrical conductivity than the conductivity of the shield layers and the coating does not extend over the portions of the shield layers surrounding the openings 32. A notch 34, which is shown in FIG. 2, is present in one embodiment to leave an area free for placement of motor leads near the axle.

One convenient feature of the shield is that it can be installed on a motor which has already been attached to a gear box and mounted on an axle. This eliminates the costly process of removing the motor from the gear unit and axle to install the shield and then remounting it.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An AC induction railway motor for driving an axle, the motor comprising:

a motor housing:

an electromagnetic shield for the motor adapted to be positioned between the motor and the axle, the shield comprising a stack of ferro-magnetic shield layers, each one of the shield layers at least partially electrically insulated from the others of the shield layers and having at least two openings, each of the openings of any one of the shield layers being substantially aligned with corresponding openings in others of the shield layers to form a set of aligned openings, and at least two fasteners, each fastener extending through a respective set of aligned openings and into a corresponding opening in the motor housing for fastening the shield layers over a portion of the motor housing facing the axle.

2. The motor of claim 1, wherein each of the shield layers is at least partially coated by a respective thin electrically insulative coating layer.

3. The motor of claim 1, wherein the stack of shield layers includes a plurality of insulation layers, each one of the plurality of insulation layers situated between a respective pair of shield layers.

4. The motor of claim 1, wherein the housing includes at least one shield support bracket and wherein the openings in the housing are located in the at least one shield support bracket.

5. The motor of claim 4, further including two clamping plates, each of the clamping plates overlying a respective portion of the shield layers and having at least one opening through which a respective one of the fasteners extends.

6. The motor of claim 5, further including two edge guards, each edge guard positioned at least partially between a respective one of the two clamping plates and the shield layers.

7. An AC motor for driving an axle, the motor comprising:

a motor housing;

an electromagnetic shield for the AC motor, the shield being adapted to be positioned between the motor and the axle and comprising a stack of ferro-magnetic shield layers, each one of the shield layers at least partially electrically insulated from the others of the shield layers, each one of the shield layers being substantially aligned with the others of the shield layers; and positioning means for positioning the shield layers over a portion of the housing facing the axle.

8. The motor of claim 7, wherein each of the shield layers is at least partially coated by a respective thin non-magnetic, electrically insulative coating layer.

9. The motor of claim 7, wherein the stack of shield layers includes a plurality of insulation layers, each one of the plurality of insulation layers situated between a respective pair of shield layers.

10. The motor of claim 7, wherein the positioning means comprises a weld of the shield layers to the housing.

11. The motor of claim 7, wherein the positioning means comprises an adhesive bond of the shield layers to the housing.

12. A housing for an AC motor drivingly coupled to an axle, the housing including an electromagnetic shield for the AC motor, the shield being adapted to be positioned between the motor and the axle and comprising a stack of ferro-magnetic shield layers, each one of the shield layers at least partially electrically insulated from the others of the shield layers, each one of the shield layers being substantially aligned with the others of the shield layers, each of the shield layers having at least two openings, each of the openings of any one of the shield layers being substantially aligned with corresponding openings in others of the shield layers to form a set of aligned openings; and positioning means for positioning the shield layers over a portion of the housing facing the axle, the positioning means including at least two fasteners, each fastener extending through a respective set of aligned openings and into a corresponding opening in the housing for fastening the shield layers.

13. The housing of claim 12, wherein the housing includes at least one shield support bracket and wherein the openings in the housing are located in the at least one shield support bracket, and further including two clamping plates, each of the clamping plates overlying a respective portion of the shield layers and having at least one opening through which a respective one of the fasteners extends.

14. A vehicle drive system comprising:

an AC induction railway motor;

an electromagnetic shield including a stack of ferromagnetic shield layers, each one of the shield layers at least partially electrically insulated from the others of the shield layers and having at least one opening, the opening of any one of the shield layers being substantially aligned with the openings in others of the shield layers to form a set of aligned openings;

an axle; and at least one fastener extending through the set of aligned openings and into a opening in the AC motor for fastening the shield layers over a portion of a housing of the AC motor between the motor and the axle.

15. The vehicle drive system of claim 14, wherein the housing includes at least one shield support bracket and wherein the opening in the housing is located in the shield support bracket, and further including at least one clamping plate overlying a portion of the shield layers and having at least one opening through which the fastener extends.

16. The vehicle drive system of claim 14, wherein each of the shield layers is at least partially coated by a respective thin electrically insulative coating layer.

17. The vehicle drive system of claim 14, wherein the stack of shield layers includes a plurality of insulation layers, each one of the plurality of insulation layers situated between a respective pair of shield layers.

* * * * *